(No Model.)
A. D. BEEDLE.
FOLDING VEHICLE AWNING.
No. 372,448. Patented Nov. 1, 1887.
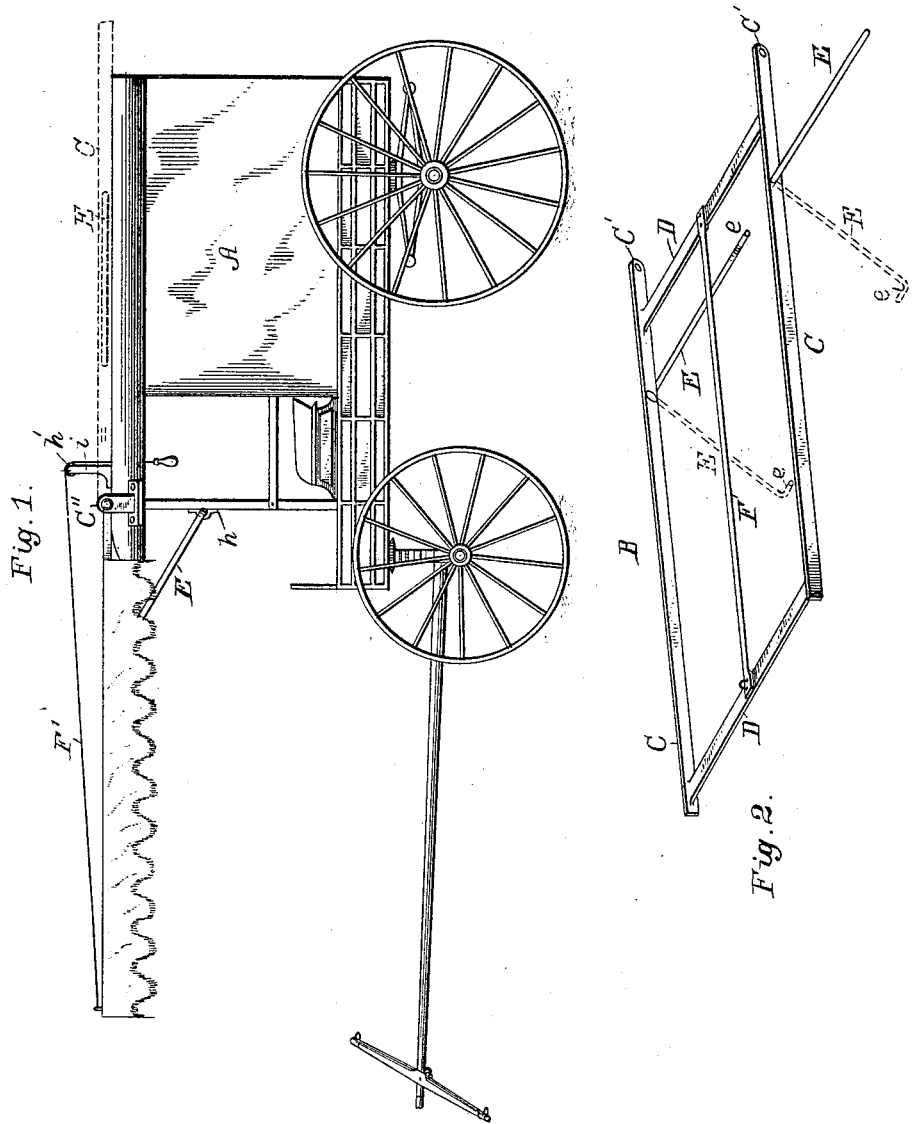
WITNESSES
F. G. Fischer
A. Mason
INVENTOR
Agustus D. Beedle
By J. R. Higdon
Attorney

UNITED STATES PATENT OFFICE.

AUGUSTUS D. BEEDLE, OF KANSAS CITY, MISSOURI.

FOLDING VEHICLE-AWNING.

SPECIFICATION forming part of Letters Patent No. 372,448, dated November 1, 1887.

Application filed July 8, 1887. Serial No. 243,708. (No model.)

*To all whom it may concern:*

Be it known that I, AUGUSTUS D. BEEDLE, of Kansas City, Jackson county, Missouri, have invented certain new and useful Improvements in Folding Vehicle-Awnings, of which the following is a full, clear, and exact description, reference being had to the accompanying drawings, forming a part hereof.

The object of my invention is to provide an awning for vehicles of all kinds, but more particularly for covered wagons and street-cars, that may be extended over the horses and protect them from the excessive and exhausting heat of summer, and that may be folded back upon the top of the vehicle out of way when not in use.

The invention may be said to consist in a suitable awning-frame that is hinged at its rear end to the top of the vehicle, so as to be either extended forward over the horses or folded back upon the top of the vehicle.

The invention consists, further, in certain details of construction and devices for operating the awning-frame, which will be fully hereinafter described, and pointed out in the claims.

In the drawings, which illustrate the manner of carrying out my invention, Figure 1 is a side elevation of a covered wagon to which my invention has been applied, and Fig. 2 is a perspective view of awning-frame detached.

A represents a covered wagon—or, for instance, a street-car—of any ordinary construction, to the front end of the cover of which the awning-frame B is hinged, so as to extend out over the horses when in use, and in which position it is supported by means of braces E, and which, when not in use, may be turned backwardly upon its hinges until it lies upon the top of the vehicle and in a plane that is parallel thereto. Said awning-frame consists in a pair of parallel side bars, C, which are connected together by means of any desired number of cross-bars—such as D—and a centrally-located longitudinal bar, F, having its ends connected to said cross-bars and being located between the side bars, C.

Upon the top of the vehicle are located hinged brackets C'', to which the rear ends of said side bars are connected by means of a bolt which passes through said brackets and through apertures C', formed in the rear ends of said bars. Of course, however, the side bar of the awning-frame may be hinged to the vehicle-top in any other suitable way that will answer the purpose, although I much prefer the arrangement here shown. Brace-rods E (one for each side bar) have their upper ends pivotally attached to the side bars, while their lower ends are bent so as to form a hook, e, for engaging an eye or suitable bearing of some description, h, which is located upon the forward vertical supports of the vehicle-cover, and they support the awning-frame in a horizontal position when extended over the horses during use.

If I so desire, I may form the lower ends of the braces E in a different manner from what I here show, and that will still answer the same purpose for which I now exhibit them, the only essential feature of their construction being that they shall support the awning-frame in substantially the position I have indicated it in.

The braces E may be detached from the bearings h by simply withdrawing hook e from said bearings, when the awning-frame may be thrown back upon the top of the vehicle, as indicated by dotted lines in Fig. 1. In some cases, however, I may make the upper ends of said braces detachable from the side bars and permanently secure their lower ends to the vehicle without departing from my invention, the construction being substantially similar to that just described.

For the purpose of readily accomplishing the folding back of the awning-frame, I attach a suitable cord or chain, F', to the front end of said frame and pass it over a small pulley, h', carried by bracket i, that is also located on the top of the vehicle, as indicated, and extend said cord downwardly from the top of the vehicle within easy reach of the driver.

The operation of the invention is as follows: When it is desired to fold the awning back upon the top of the vehicle, the lower ends of braces E are first detached from the bearings h, when, by pulling the depending end of cord F', the awning will be raised upwardly and then dropped backwardly in an inverted position upon the top of the vehicle, in which position it will be completely out of the way and not liable to be damaged when the vehicle is out of use.

Having thus described my invention, what I claim is—

1. A folding vehicle-awning hinged at its rear end to top of vehicle so as to extend over the horses, and supported by means of braces having one end secured to frame of awning and the other end detachably secured to the top of the vehicle, substantially as described.

2. Frame B, in combination with braces E, which support it over the horses of the vehicle, the upper ends of said braces being loosely connected to the frame and their lower ends detachably located in bearings upon the vehicle-top, substantially as described.

3. The combination, with the supporting-frame composing the vehicle-top, of frame B, brackets C'', to which the rear end of frame B is attached, braces E, having their upper ends hinged to the side bars, C, of said frame, pulley or roller $h'$, and chain or cord F', which is operated over pulley $h'$, substantially as described.

4. The combination, with the supporting-frame composing the vehicle-top, of folding frame B, braces E, bearings $h$, for receiving the lower ends of said braces, brackets C'', located on the top of the vehicle, and to which the rear end of said frame is hinged, cord or chain F', and pulley or roller $h'$, also located on top of the vehicle, substantially as described.

In testimony whereof I affix my signature in presence of two witnesses.

AUGUSTUS D. BEEDLE.

Witnesses:
A. SAVAGE,
F. G. FISCHER.